(12) United States Patent
Xiong

(10) Patent No.: US 10,178,720 B1
(45) Date of Patent: Jan. 8, 2019

(54) LOW STANDBY POWER CONTROL CIRCUIT FOR LED DRIVER

(71) Applicant: Universal Lighting Technologies, Inc., Madison, AL (US)

(72) Inventor: Wei Xiong, Madison, AL (US)

(73) Assignee: Universal Lighting Technologies, Madison, AL (US)

( * ) Notice: Subject to any disclaimer, the term of this patent is extended or adjusted under 35 U.S.C. 154(b) by 0 days.

(21) Appl. No.: 15/872,538

(22) Filed: Jan. 16, 2018

Related U.S. Application Data

(60) Provisional application No. 62/447,045, filed on Jan. 17, 2017.

(51) Int. Cl.
| | | |
|---|---|---|
| H05B 37/02 | (2006.01) | |
| H02M 3/335 | (2006.01) | |
| H05B 33/08 | (2006.01) | |

(52) U.S. Cl.
CPC ........ H05B 33/0815 (2013.01); H02M 3/335 (2013.01); H05B 33/0842 (2013.01); H05B 37/0218 (2013.01)

(58) Field of Classification Search
CPC ............ H05B 33/0842; H05B 33/0815; H05B 7/0218
See application file for complete search history.

(56) References Cited

U.S. PATENT DOCUMENTS

| | | | |
|---|---|---|---|
| 7,843,141 B1 | 11/2010 | Xiong et al. | |
| 2010/0149838 A1* | 6/2010 | Artusi | H02M 1/4225 363/20 |
| 2012/0026759 A1* | 2/2012 | Balakrishnan | H02M 3/33523 363/21.15 |
| 2013/0300310 A1* | 11/2013 | Hu | H05B 33/0854 315/239 |
| 2014/0152187 A1 | 6/2014 | Lin et al. | |
| 2014/0346874 A1* | 11/2014 | Fang | H02M 3/33523 307/31 |
| 2015/0042227 A1 | 2/2015 | Kumar et al. | |

* cited by examiner

*Primary Examiner* — Dedei K Hammond
*Assistant Examiner* — Raymond R Chai
(74) *Attorney, Agent, or Firm* — Patterson Intellectual Property Law, P.C.; Gary L. Montle; Grant M. Ford

(57) ABSTRACT

An LED driver is configured to minimize power consumption during standby operating modes. The LED driver includes power factor correction (PFC) and isolated DC-DC conversion stages, driven by respective first and second regulators. An auxiliary sensor detects environmental conditions for a controller which generates standby or normal operating mode signals based thereon. A low standby isolated power supply circuit receives operating mode signals and is configured: responsive to normal operating mode signals to enable the voltage regulators; responsive to standby mode signals to disable the voltage regulators, and in both modes to supply power to the controller and auxiliary sensor. Accordingly, the controller and auxiliary sensor are continuously enabled whereas the PFC and DC-DC stages of the LED driver are disabled during standby modes. Additional circuitry may selectively disconnect voltage sensing resistance networks from the LED driver for further reductions in power consumption during standby mode.

7 Claims, 5 Drawing Sheets

LOW STANDBY POWER CONTROL CIRCUIT FOR LED DRIVER

CROSS-REFERENCES TO RELATED APPLICATIONS

This application claims priority to and benefit of U.S. Provisional Patent Application No. 62/447,045, dated Jan. 17, 2017, entitled "Low Standby Power Control Circuit for LED Driver," and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a low standby power control circuit for light emitting diode (LED) drivers. More particularly, the present invention relates to apparatuses, systems, and methods for providing the low standby power control circuit for LED drivers.

The lighting market has a desire for LED drivers having low consumption of power during "standby" modes, which means that when an LED driver is in an idle state (for example, when an occupancy sensor senses that a room is not occupied) the standby power should be very low, e.g., <0.5 W. It is also desired for the LED driver to maintain operation of a sensor that is connected to the driver in order to determine when the standby mode is appropriate.

Traditional LED driver designs are incapable of coupling to auxiliary devices while simultaneously meeting the very low standby power goals of today's market. If the LED driver components are operational during standby mode, in order for example to maintain power to the auxiliary devices and the controller, power consumption is still unacceptably high (e.g., about 2-3 W for a typical dual-stage LED driver configuration). However, as previously noted, if not only the lighting output but also the LED driver components themselves are disabled during standby mode, the LED driver is unable to power the auxiliary sensor or determine when the driver should transition from standby mode to normal operation.

BRIEF SUMMARY OF THE INVENTION

It is desirable to provide a light emitting diode (LED) driver circuit capable of keeping input power extremely low in standby mode.

One object of the systems and methods disclosed herein is to provide a low standby isolated power supply circuit for a light emitting diode (LED) driver. The low standby isolated power supply circuit includes a primary side circuit and a secondary side circuit, an input power section coupled to the primary side circuit, a switch coupled to the primary side circuit, a first input resistor coupled between the switch and the primary side circuit. The low standby isolated power supply circuit further includes a first opto-coupler having a first phototransistor side and a first diode side, the first opto-coupler coupled between the first input resistor and a gate of the switch at a phototransistor side thereof and further coupled to an operational input signal at an anode of the first diode side, and a second opto-coupler having a second phototransistor side and a second diode side, the second opto-coupler coupled between a voltage input and a voltage output at the second phototransistor side thereof.

The switch may be configured to output operating power for at least one integrated circuit (IC) of the LED driver using the switch, the first input resistor, and the first opto-coupler. The switch may also be configured to output operating power for a plurality of ICs of the LED driver using the switch, the first input resistor, and the first opto-coupler. The low standby isolated power supply may be configured to provide operating power to an auxiliary load coupled to the LED driver, to a microcontroller of the LED driver, and to at least one IC of the LED driver. The first opto-coupler may be configured to control output power to at least one IC of the LED driver responsive to the operational input signal.

The second opto-coupler may output a voltage sensing control signal responsive to a power factor correction (PFC) output signal of the LED driver. The secondary side circuit may include a microcontroller power supply output and an auxiliary power supply output.

Another object of the systems and methods disclosed herein is to provide a LED driver for providing low standby power utilization. The LED driver includes (i) a power processing circuit having a PFC stage and an isolated DC-DC converter stage, and (ii) a low power standby isolated power supply module having: a primary side circuit and a secondary side circuit, an input power section coupled to the primary side circuit, a switch coupled to the primary side circuit, a first input resistor coupled between the switch and the primary side circuit, a first opto-coupler having a first phototransistor side and a first diode side, the first opto-coupler coupled between the first input resistor and a gate of the switch at a phototransistor side thereof and further coupled to an operational input signal at an anode of the first diode side, and a second opto-coupler having a second phototransistor side and a second diode side, the second opto-coupler coupled between a voltage input and a voltage output at the second phototransistor side thereof.

The PFC stage may include at least one first IC and the isolated DC-DC converter stage may include at least one second IC. The switch may output operating power for at least one of the at least one first IC and the at least one second IC using the switch, the first input resistor, and the first opto-coupler. The isolated DC-DC converter stage may include a microcontroller and a first IC and the PFC stage may include a second IC. The low standby isolated power supply module may provide operating power to an auxiliary load coupleable to the LED driver via the isolated DC-DC converter stage, to the microcontroller, and to at least one of the first IC and the second IC. The power processing circuit and the isolated DC-DC converter stage may each include at least one IC and the first opto-coupler may control power supplied to at least one IC responsive to the operational input signal. The second opto-coupler may output a voltage sensing control signal responsive to a PFC output signal provided by the PFC stage. The secondary side circuit of the low standby isolated power supply module includes a microcontroller power supply output and an auxiliary power supply output.

The PFC stage includes a PFC converter coupled to a power input of the power processing circuit, the PFC converter configured to output bus voltage V_bus, the low standby isolated power supply module configured to sense the output bus voltage V_bus via the second opto-coupler. The PFC stage includes a PFC converter, a voltage divider, and an IC, and wherein the voltage V_bus is provided to the IC across the voltage divider as a voltage V_sense, the IC being configured to control at least one operation of the PFC converter based at least in part upon the voltage V_sense.

A further object of the systems and methods disclosed herein is to provide a method of providing low standby power consumption for an LED driver. The method begins by receiving input power at both a power processing circuit and at a low standby isolated power supply circuit of the LED driver. At least one signal is obtained from an auxiliary port of the LED driver. An operational status of the LED driver is determined based at least in part upon the obtained at least one signal, the operational status comprising one of an operational status and a standby status. At least a portion of the LED driver is selectively powered responsive to the determined operational status of the LED driver. Obtaining the at least one signal may include receiving the at least one signal from an occupancy sensor. The low standby isolated power supply circuit may selectively power a first integrated circuit of a PFC stage of the power processing circuit and selectively power a second integrated circuit of an isolated DC-DC converter stage of the power processing circuit based at least in part upon the determined operational status of the LED driver. An auxiliary load coupled to the LED driver may be selectively powered by the low standby isolated power supply circuit. A microcontroller of the power processing circuit may be selectively powered by the low standby isolated power supply circuit.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

Figure 1:
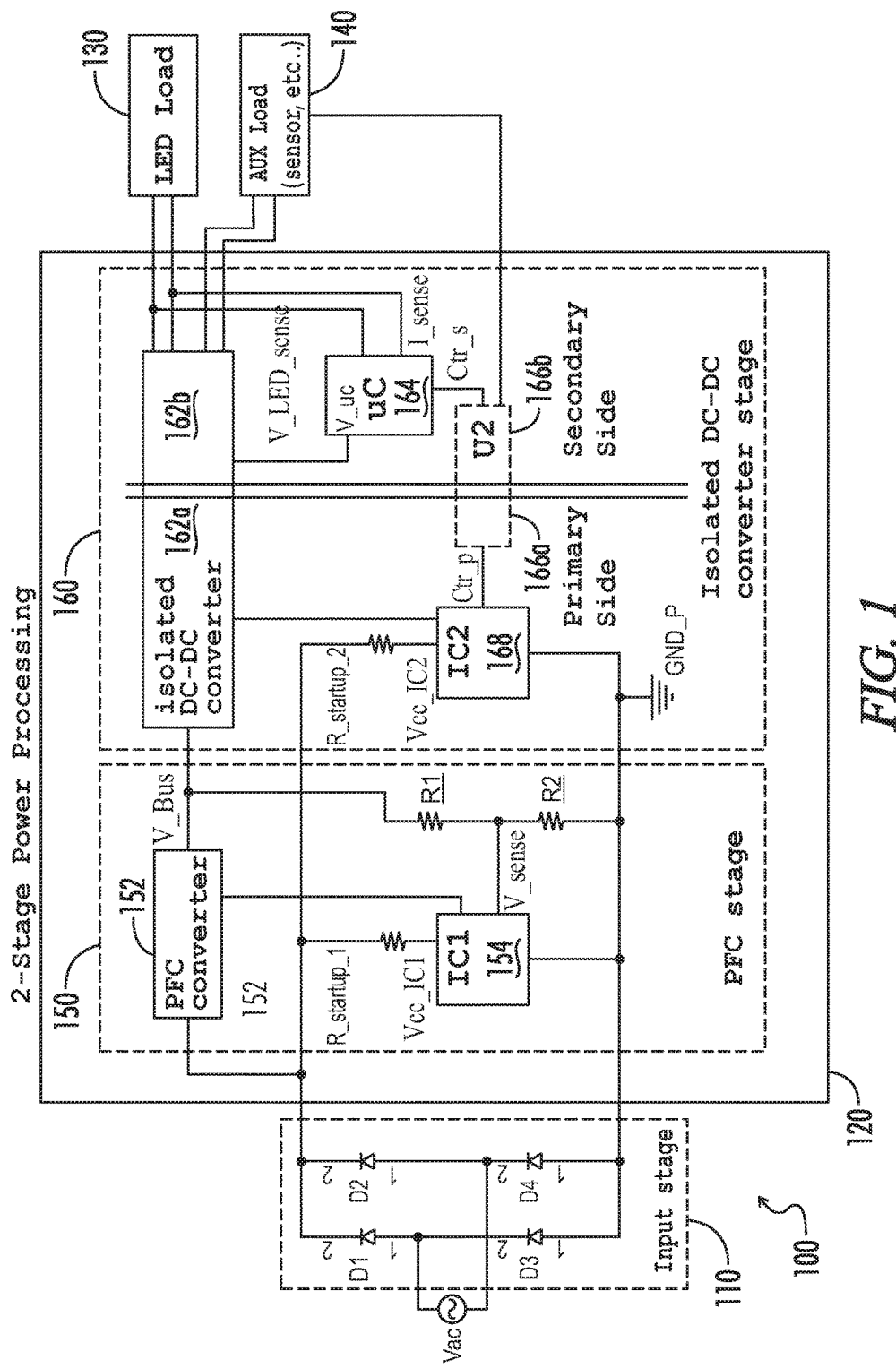
FIG. 1 illustrates a partial circuit schematic for a traditional two-stage isolated LED driver.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-5, exemplary systems, methods, and apparatuses are now illustrated in greater detail. Where the various figures may describe embodiments sharing various common elements and features with other embodiments, similar elements and features are given the same reference numerals and redundant description thereof may be omitted below.

The present disclosure generally relates to a low power standby power control circuit for LED drivers.

FIG. 1 illustrates a traditional two-stage isolated LED driver. The LED driver 100 includes an input alternating current (AC) voltage source Vac. The input AC voltage source Vac is coupled to an input stage 110. The input stage 110 includes a rectifying diode bridge having diodes D1, D2, D3, and D4. A first input line from the input AC voltage source Vac is coupled to an anode of the diode D1. The cathode of the diode D1 is coupled to the cathode of the diode D2. The first input line from the input AC voltage source Vac is further coupled to the cathode of the diode D3. The anode of the diode D3 is coupled to the anode of the diode D4. A second input line from the input AC voltage source Vac is coupled between the anode of the diode D2 and the cathode of the diode D4. The input stage 110 is configured to convert an AC input power received from the input AC voltage source Vac, to rectify the AC input power, and to output corresponding direct current (DC) power to the two-stage power processing module 120.

The two-stage power processing module 120 includes a power factor correction (PFC) stage 150 and an isolated DC-DC converter stage 160. The PFC stage 150 includes a PFC converter 152, an integrated circuit IC 154, a start-up resistor R_startup_1, and a voltage divider consisting of a first dividing resistor R1 and a second dividing resistor R2. The PFC stage 150 is configured to perform power factor correction on DC power received at the two-stage power processing module 150 from the input stage 110.

The output of the PFC converter 152 is a stiff DC voltage source, V_bus. The integrated circuit IC 154 may be a transition mode PFC controller, such as a model L6562 PFC controller. The integrated circuit IC 154 is configured to control the PFC converter 152 (e.g., to control an output voltage V_bus of the PFC controller 152). The start-up resistor R_startup_1 is a startup resistor for the integrated circuit IC 154. The first dividing resistor R1 and the second dividing resistor R2 sense the output voltage from the PFC controller 152 and feed the voltage information back to integrated circuit IC 154 to regulate the output voltage V_bus tightly.

The isolated DC-DC converter stage 160 is coupled to the output of the PFC stage 150 to regulate output LED current and to provide auxiliary power for an auxiliary load (e.g., light sensors, occupy sensors, etc.). The isolated DC-DC converter stage 160 includes an isolated DC-DC converter 162, a microcontroller 164, an isolating device 166, and integrated circuit IC 168, a second start-up resistor R2, and both a primary side ground GND_P and a secondary side ground GND_S.

The isolated DC-DC converter 162 is coupled to both the primary side ground GND_P and the secondary side ground GND_S. For example, the isolated DC-DC converter may be coupled to the primary side ground GND_P at a converter primary side 162a, and may be coupled to the secondary side ground GND_S at a converter secondary side 162b. Like the isolated DC-DC converter 162, the isolating device 166 is coupled to both the primary side ground GND_P and the secondary side ground GND_S. The isolated DC-DC converter is configured to provide output power to an LED load 130 and an auxiliary load 140. The auxiliary load 140 may be a sensor, such as an occupancy sensor. The microcontroller 164 is coupled to an output of the isolated DC-DC converter 162 at the converter secondary side 162b. The microcontroller 164 senses an LED output voltage V_LED_sense output by the isolated DC-DC converter 162 and provided to the LED load 130. The microcontroller 164 also senses an LED output current I_sense output by the isolated DC-DC converter 162 and provided to the LED load 130.

On the primary side of the isolated DC-DC converter stage 160, the second integrated circuit IC 168 controls the isolated DC-DC converter 162. The second start-up resistor R_startup_2 is the startup resistor for the second integrated circuit IC 168. The microcontroller 164 provides primary side control information (Ctr_p) to the second integrated circuit IC 168 via the isolating device 166. The isolating device 166 may be an opto-isolator such as an opto-coupler, may be a signal transformer, or the like. The isolating device 166 receives a secondary side control signal Ctr_s at a secondary side thereof from the microcontroller 164, and outputs a primary side control signal Ctr_p to the second integrated circuit 168. The second integrated circuit 168 is coupled to the isolated DC-DC converter 162 at the primary side 162a thereof, and provides control signals to the DC-DC converter 162 corresponding to the primary side control signal Ctr_p.

Each of the PFC converter 152, the first start-up resistor R_startup_1, and the second start-up resistor R_startup_2 are coupled to an output of the input stage 110. As such, the output of the input stage 110 is configured to provide input power to the PFC converter 152 and to power the first integrated circuit 154 and the second integrated circuit 168 (via the first startup resistor R_startup_1 and second startup resistor R_startup_2, respectively).

When an auxiliary load 140 such as a sensor requires the LED driver 100 to be in standby mode, the PFC stage 150 and the isolated DC-DC converter stage 160 may still be operational and controlling the LED output current to 0, since the isolated DC-DC converter 162 must continue to operate to provide auxiliary power and to power the second microcontroller 164 to keep the auxiliary load 140 functioning and the microcontroller 164 working. The PFC stage 150 must also be operational to enable the isolated DC-DC converter 162 to work.

Thus, when operating in standby mode, even when the LED load 130 doesn't have any load current, everything is actually effectively working like normal. As a result, power consumption in standby mode is high (e.g., typically around 2-3 Watts for the two-stage driver solution illustrated by FIG. 1). The 2-3 W standby power is too much in standby mode nowadays for marketing, whose requirement is less than 0.5 W.

As illustrated and described with reference to the LED driver system 100 of FIG. 1, it is apparent that without a specifically-designed control circuit it is not capable to meet the 0.5 W standby power consumption target. In order to meet the 0.5 W standby power target the system may be modified by (1) shutting down both the PFC stage 150 and the isolated DC-DC converter stage 160 to reduce power consumption; (2) shutting down the integrated circuits IC 154 and second IC 168 to minimize power dissipation across the start-up resistors R_startup_1 and R_startup_2, (3) V-bus sensing via the voltage dividing resistors R1 and R2 must be shut down to minimize power dissipation; (4) the auxiliary port corresponding to the auxiliary load 140 must be placed in a standby mode for monitoring external information (e.g., for an occupancy sensor as the auxiliary load, if someone enters a monitored room, a signal must be sent to the LED driver 100 to turn on the LED load 130 from the standby mode); and (5) the microcontroller 164 must keep working to receive one or more commands from the auxiliary load 140 (e.g., a sensor).

Figure 2:
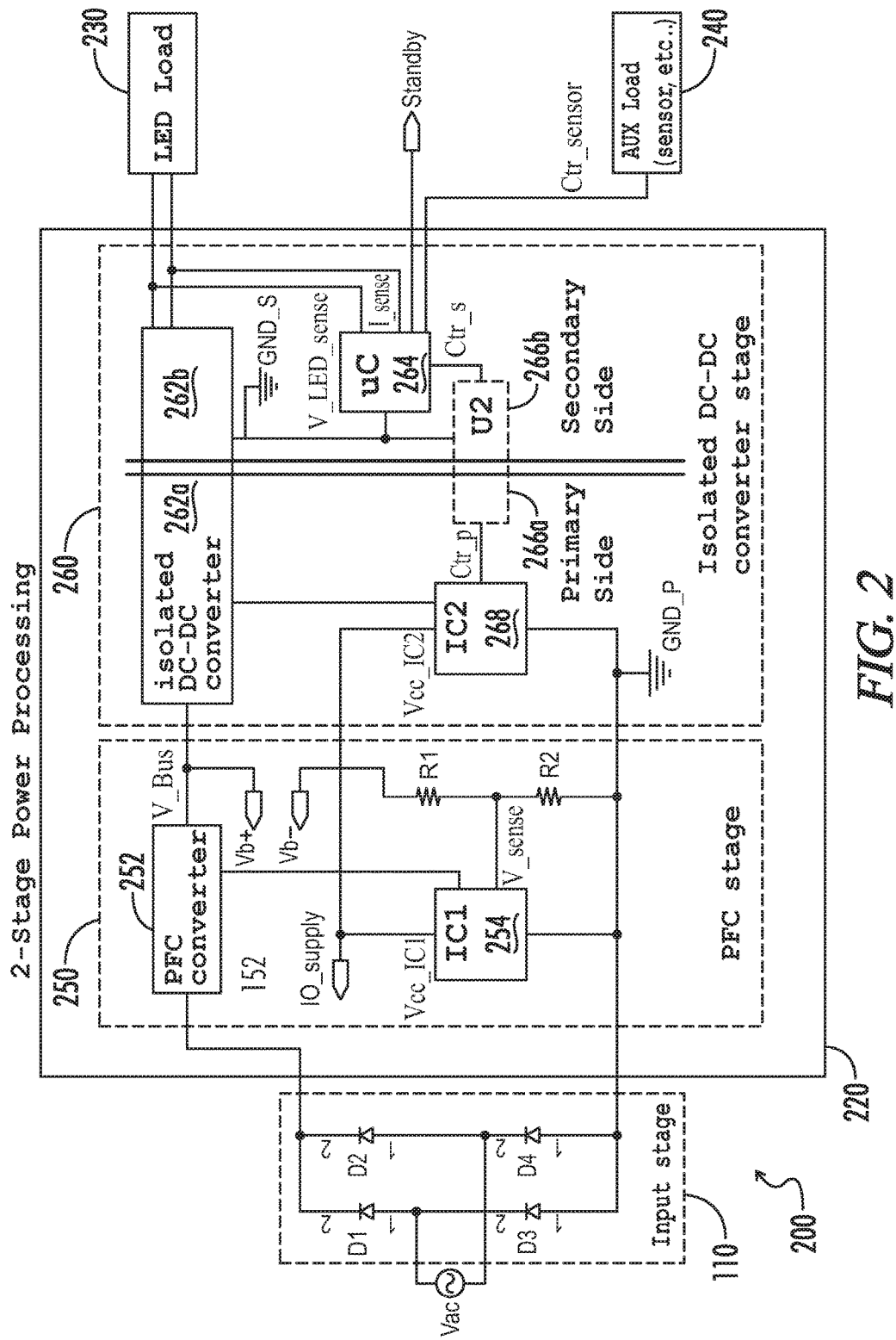
FIG. 2 illustrates a partial circuit schematic for an exemplary embodiment of a portion of a light emitting diode (LED) driver system having a two-stage power processing module according to aspects of the present disclosure.

FIG. 2 illustrates an exemplary embodiment of a portion of a light emitting diode (LED) driver system 200 having a two-stage power processing module 220 according to aspects of the present disclosure. The LED driver system 200 includes at least one of an input AC voltage source Vac, an input stage 110, a two-stage power processing module 220, an LED load 230, and/or an auxiliary load 240. The input AC voltage source Vac and the input stage 110 may be equivalent in at least one of structure and/or functionality to the same as illustrated by and described with reference to FIG. 1.

The two-stage power processing module 220 may be coupled to at least one output of the input AC voltage source Vac. Additionally or alternatively, the two-stage power processing module may be coupled to a direct current (DC) power source or any other source capable of providing operational power to at least a portion of at least one of the two-stage power processing module, the LED load 230, and/or the auxiliary load 240. The PFC stage 250 may include one or more of a PFC converter 252, and integrated circuit (IC) 254, a first voltage dividing resistor R1, and a second voltage dividing resistor R2.

At least one output of the power stage 110 may be coupled to the PFC converter 252. The PFC converter 252 may be configured to output a bus voltage V_bus. The bus voltage V_bus may be output from the PFC stage 250 as a signal Vb+ (for example to a low standby isolated power supply module 300, as described below with reference to FIG. 3). An input signal Vb− may be coupled to the first voltage dividing resistor R1. The first dividing resistor R1 and the second dividing resistor R2 may be configured to divide the input voltage Vb− to a sense voltage V_sense. The sense voltage V_sense may be input to the IC 254. The IC 254 may be configured to output a PFC converter control signal.

The V_bus output from the PFC converter 252 may be further coupled to the isolated DC-DC converter stage 260, for example at the isolated DC-DC converter 262 thereof. In one exemplary embodiment, the V_bus signal is received at a primary side 262a of the isolated DC-DC converter 262. The primary side 262a of the isolated DC-DC converter 262 may be coupled to a second IC 268. The second IC 268 may be coupled to the IC 254 of the PFC stage 250 and may be configured to receive operating power via the signal IC_supply. Each of the IC 254, the second dividing resistor R2, and/or the second IC 268 may be coupled to a primary side ground GND_P of the two-stage power processing module 220.

The isolated DC-DC converter stage 260 may further include an isolating device 266 having a primary side portion 266a and a secondary side portion 266b. The primary side portion 266a of the isolating device 266 may be coupled to the second IC 268 and configured to output at least one primary side control signal Ctr_p. The secondary side 266b of the isolating device 266 may be configured to receive a secondary side control signal Ctr_s and to provide at least one of the secondary side control signal Ctr_s or representation thereof to the second IC 268 via the primary side portion 266a of the isolating device 266. One or more of the secondary side 262b of the isolated DC-DC converter 262, the microcontroller 264, and/or the secondary side portion 266b may be coupled to a secondary side ground GND_S.

The isolated DC-DC converter 262 is coupled to both the primary side ground GND_P and the secondary side ground GND_S. For example, the isolated DC-DC converter 262 may be coupled to the primary side ground GND_P at a converter primary side 262a, and may be coupled to the secondary side ground GND_S at a converter secondary side 262b. Like the isolated DC-DC converter 262, the isolating device 266 may be coupled to both the primary side ground GND_P and to the secondary side ground GND_S. The isolated DC-DC converter 262 may be configured to provide output power to an LED load 230 and/or an auxiliary load 240. The auxiliary load 240 may be a sensor, such as an occupancy sensor, and/or any other sensing or auxiliary device. The microcontroller 264 is coupled to an output of the isolated DC-DC converter 262 at the converter secondary side 262b. The microcontroller 264 may be configured to sense an LED output voltage V_LED_sense output by the isolated DC-DC converter 262 and coupleable to the LED load 230. The microcontroller 264 may also be configured to sense an LED output current I_sense output by the isolated DC-DC converter 262 and coupleable to the LED load 230.

The microcontroller 264 may be coupleable to the auxiliary load 240 via at least one conductive path. The auxiliary load 240 and microcontroller 264 may be configured to communicate via one or more control signals Ctr_sensor. In one exemplary embodiment, the auxiliary load 240 is configured to transmit at least one control signal Ctr_sensor to the microcontroller 264. Additionally or alternatively, the microcontroller 264 may be configured to transmit one or more control signals Ctr_signal to the auxiliary load 240 to control one or more operations of the auxiliary load or device coupled thereto. Although described as being communicated via a conductive line, it should be appreciated that the control signal Ctr_sensor may be transmitted between the microcontroller 264 and the auxiliary load 240 via one or more wired or wireless connections, or combination thereof.

The microcontroller 264 may be coupled to an output of the two-stage power processing module 220 via a Standby signal. The Standby signal may be output by the two-stage power processing module 220 and/or received at a low standby isolated power supply module, for example as described below with reference to FIG. 3.

Figure 3:
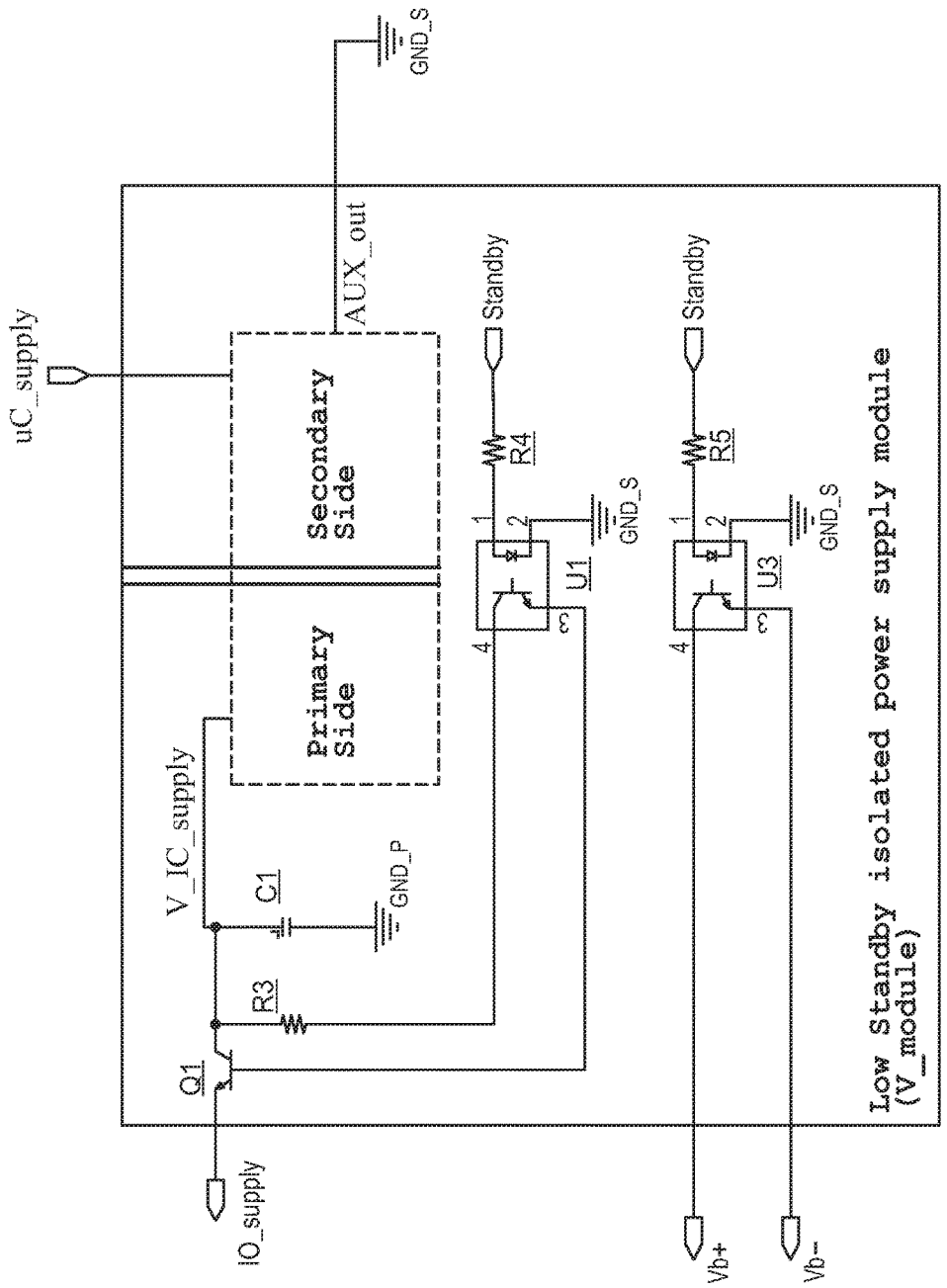
FIG. 3 illustrates a partial circuit schematic for an exemplary embodiment of a low standby isolated power supply module according to aspects of the present disclosure.

FIG. 3 illustrates an exemplary embodiment of a low standby isolated power supply module 300 according to aspects of the present disclosure. The low standby isolated power supply module 300 include one or more of a switch Q1, a resistor R3, a capacitor C1, input resistors R4 and R5, and opto-couplers U1 and U3. The low standby isolated power supply module 300 may be configured to receive one or more signals and to output one or more signals. For example, in one exemplary embodiment, the low standby isolated power supply module is configured to receive a microcontroller supply signal uC_supply, an IC supply signal IC_supply, and the voltage bus signal Vb+. The low standby isolated power supply module 300 may further be configured to output one or more signals, for example a voltage bus signal Vb−.

The switch Q1 may be transistor configured to perform one or more switching operations. In one exemplary embodiment, the switch Q1 is a bipolar transistor having its emitter configured as output from the low standby isolated power supply module 300 as the signal IC_supply, having its collector coupled to the resistor R3, to the capacitor C1, and to the primary side output V_IC_supply. The capacitor C1 may be further coupled to ground. The resistor R3 may also be coupled to the opto-coupler U1, for example at a collector input of a phototransistor side of the opto-coupler U1. An output of the opto-coupler U1 corresponding to the phototransistor side of the opto-coupler may be coupled to a base of the switch Q1 and may be configured to control at least one operation of the switch Q1. The Standby signal output by the microcontroller 264 may be used as input to the diode side of the opto-coupler U1 at an anode portion thereof across the resistor R4. Output from the cathode of the diode side of the opto-coupler U1 may be provided to the secondary side ground GND_S.

The opto-coupler U3 may receive the signal Vb+ from the output of the PFC converter 252 at a collector of the phototransistor side of the opto-coupler U3. The Standby signal output by the microcontroller 264 may be used as input to the diode side of the opto-coupler U3 at an anode portion thereof across the resistor R5. Output from the cathode of the diode side of the opto-coupler U3 may be provided to the secondary side ground GND_S. Output from the phototransistor side of the opto-coupler U3 may be provided as the signal Vb−. The secondary side of the low standby isolated power supply module 300 may provide an auxiliary output power signal AUX_out.

Figure 4:
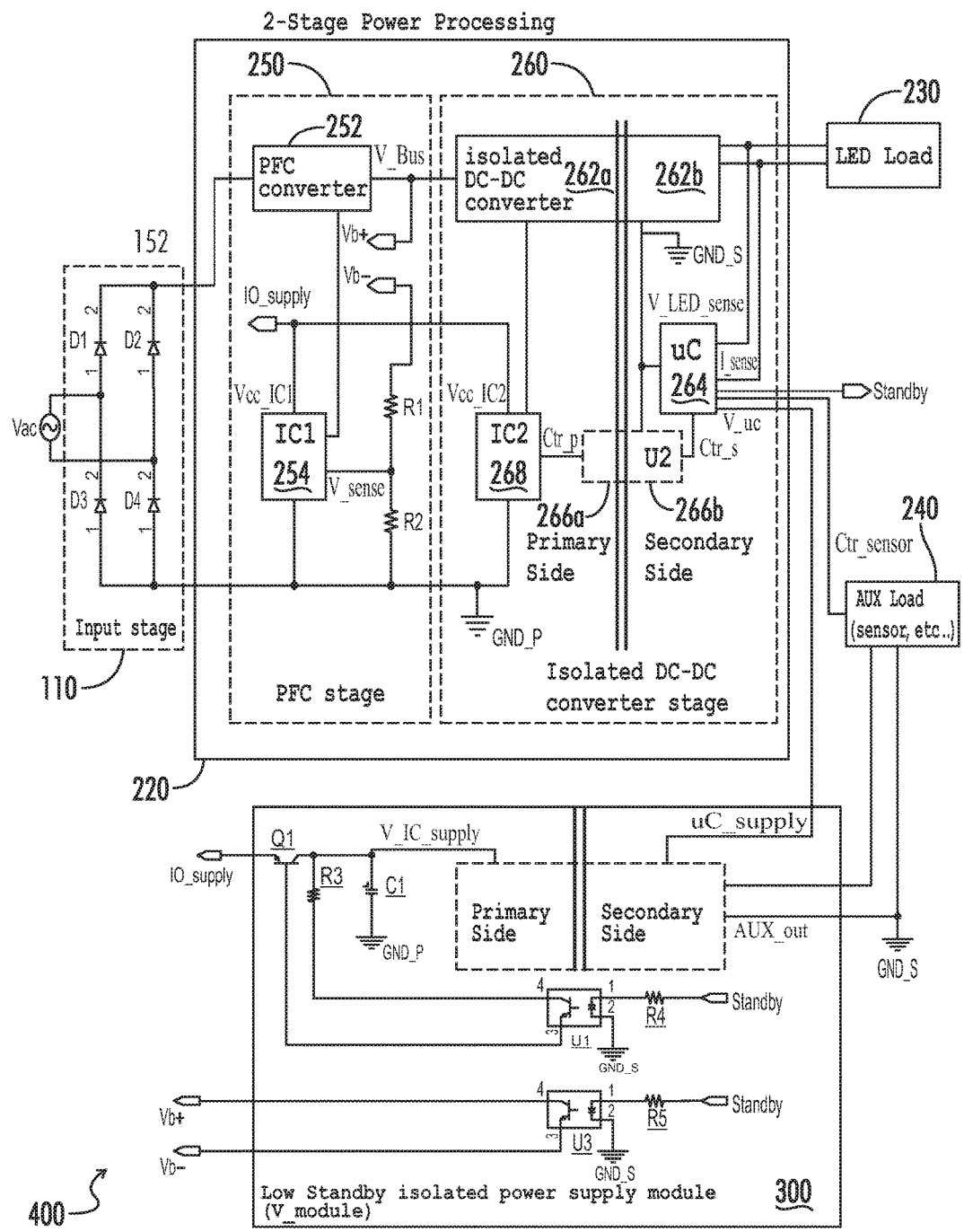
FIG. 4 illustrates a partial circuit schematic for an exemplary embodiment of a combined two-stage power processing module and a low standby isolated power supply module.

FIG. 4 illustrates an exemplary embodiment of a combined two-stage power processing module 200 and a low standby isolated power supply module 300. The output of the input stage 110 may be coupled to both the two-stage power processing module 200 and to the low standby isolated power supply module, for example via one or more conductive lines. The microcontroller 264 may be provided operating power from the secondary side of the low standby isolated power supply module 300, for example via the uC_supply signal output from the low standby isolated power supply module 300. In various embodiments, an LED driver according to aspects of the present disclosure may include one or more components of the two-stage power processing module 200, the low standby isolated power supply module 300, and/or the input stage 110, in combination with one or more additional LED driver components.

A low standby isolated power supply module (V_module) 300 may be configured to have a low standby power, for example, via a flyback DC-DC converter configuration. The low standby isolated power supply module 300 may be configured to provide all the power supply for the IC 254, the second IC 268, the microcontroller 264, and/or the auxiliary port.

The low standby isolated power supply module 300 may be configured to receive input from the output of diode bridge (D1-D4) and to regulate the diode bridge output to three different type of DC voltage, IC_supply, uC_supply and Aux_out. In various embodiments, it is possible to do so by employing a flyback converter having multiple outputs.

The IC output voltage IC_supply may be used to power at least one of the IC 254 and the IC 268 in normal operating mode. The output controller voltage uC_supply may be used to power the microcontroller 264 and/or to ensure that the microcontroller 264 runs all of the time. The output auxiliary voltage AUX out may be configured to provide auxiliary power to at least one auxiliary load, for example to ensure that an aux load may run all of the time.

In order to minimize power consumption, in various embodiments the start-up resistors R_startup_1 and R_startup_2 for the IC 254 and the second IC 268 may be eliminated. The output IC voltage IC_supply may be used to power both the IC 254 and the second IC 268 from the low standby isolated power supply module 300. In the low standby isolated power supply module 300, the switch Q1, the resistor R3, and the opto-coupler U1 may be configured to form a circuit to enable or disable the output IC voltage IC_supply. The resistor R3 and the opto-coupler U1 emitter part are in the base drive of the switch Q1. When the emitter of the opto-coupler U1 is conducting, the IC supply voltage V_IC_supply will drive base current through the resistor R3, the opto-coupler U1, and the base to emitter of the switch Q1 such that the switch Q1 will be turned on. When the switch Q1 is on, the IC supply signal IC_supply may be enabled. When the opto-coupler U1 is disabled, the switch Q1 is off and the IC supply signal IC_supply may be disabled.

Another opto-coupler U3 may be used to enable and disable voltage sensing via the voltage dividing resistors R1 and R2. When the voltage dividing resistors R1 and R2 are disconnected from the V_bus output of the PFC converter 252, there will be no power consumption in the voltage dividing resistors R1 and R2. The emitter part of the opto-coupler U3 (Vb+, Vb−) may be connected between the V_bus output of the PFC converter 252 and the first dividing resistor R1. When the opto-coupler U3 is enabled, the voltage dividing resistors R1 and R2 will be connected to the V_bus output of the PFC converter 252 and may be configured to sense a voltage thereof. When the opto-coupler U3 is disabled, the voltage dividing resistors R1 and R2 will be disconnected from the output V_bus of the PFC converter 252 and all the voltage drop will be across the opto-coupler U3's emitter. The off impedance of the opto-coupler U3 may be configured very high such that the power dissipation from the opto-coupler U3 is very small.

The microcontroller 264 may be configured to transmit a Standby signal to at least one of the opto-couplers U1 and U3 to enable or disable the IC supply signal IC_supply and voltage sensing.

When a sensor (such as a sensor operating as the auxiliary load 240) sends a command to the microcontroller 264 to command normal operation, the microcontroller 264 may set a value of the Standby signal high to turn on detection by at least one of the opto-coupler U1 and opto-coupler U3 diode detector. As a result, the IC_supply signal IC_supply, Vb+ and Vb− may be enabled.

When an auxiliary load 240, such as a sensor, sends a Standby command to the microcontroller 264, the microcontroller 264 may set the Standby signal to low to turn off at least one of the opto-couplers U1 and U3 to disable the IC supply signal IC_supply and Vb+ and Vb−. When the IC_supply signal IC_supply is disabled, the IC 254 and the IC 268 may lose power supply and stop controlling the PFC converter 252 and the isolated DC-DC converter 262. As a result, all function of the PFC stage 250 and the isolated DC-DC converter stage 260 will be stopped to minimize the power consumption.

Figure 5:
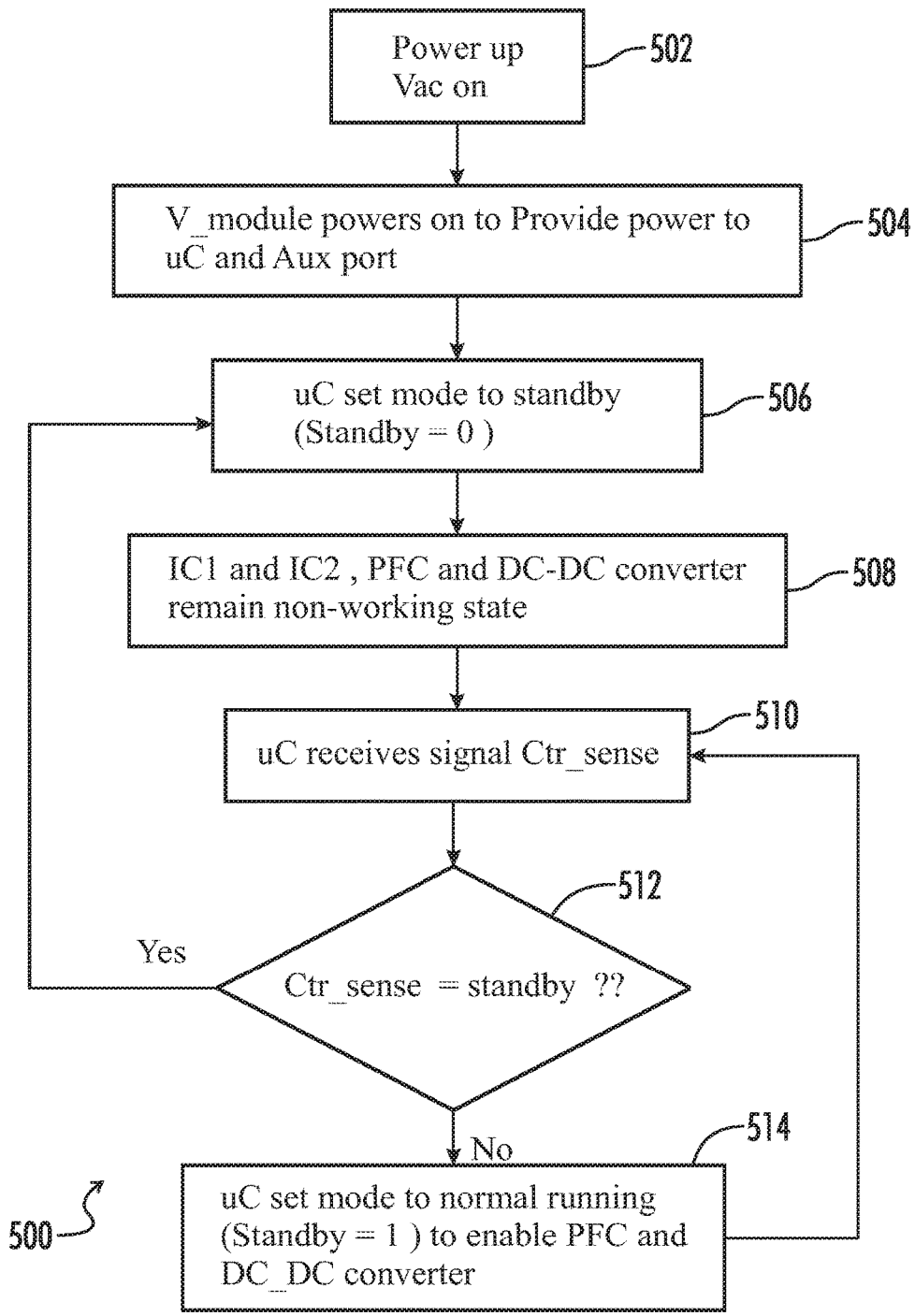
FIG. 5 illustrates a flowchart representing an exemplary control sequence according to aspects of the present disclosure.

FIG. 5 illustrates a flowchart representing an exemplary control sequence 500 according to aspects of the present disclosure. The control sequence 500 begins at a step 502, where an LED driver is powered on (e.g., input power is received via the AC input voltage source Vac as previously described herein). The process continues at a step 504, where a low standby power isolated power supply module is powered on to provide power to a microcontroller and an auxiliary port of a two-stage power processing module. The microcontroller may then set an operating mode to standby (e.g., by setting a Standby value equal to zero) at a step 506.

At step 508 a first and a second integrated circuit IC 154 and IC 168, a power factor correction (PFC) circuit, and an isolated DC-DC converter may remain in a non-working state as a result of the setting of the operating mode at the step 506. The microcontroller receives a sense control signal Ctr_sense at a step 510. The process continues to a step 512, where it determined whether the Ctr_sense signal indicates a standby status. If the Ctr_sense signal indicates a standby status, the process returns to the step 506, where the microcontroller sets the mode to standby. If it is determined at the step 512 that the Ctr_sense value does not indicate standby, the process continues to a step 514, where the microcontroller sets a mode to normal running (e.g., by setting or otherwise recognizing Standby=1) to enable the PFC stage and the isolated DC-DC converter stage.

To facilitate the understanding of the embodiments described herein, a number of terms are defined below. The terms defined herein have meanings as commonly understood by a person of ordinary skill in the areas relevant to the present invention.

Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An LED driver comprising:
a power factor correction (PFC) stage coupled to receive input power from a DC input power stage;

an isolated DC-DC power converter stage coupled to an output of the PFC stage, and configured to provide DC current to an LED lighting load;

first and second regulators configured to provide drive signals to the PFC stage and the isolated DC-DC power converter stage, respectively;

one or more auxiliary sensors configured to detect one or more environmental conditions;

a controller coupled to receive auxiliary feedback signals from the one or more auxiliary sensors, and configured to provide standby mode signals or normal operating mode signals based on a detected environmental condition from the one or more auxiliary sensors; and a low standby isolated power supply circuit comprising a power converter comprising a primary side coupled to the DC input power stage and a secondary side coupled to supply power to the controller and the one or more auxiliary sensors, a switching element coupled to the primary side of the power converter, an input resistor coupled on a first end between the switching element and the primary side of the power converter, and an isolation device configured responsive to the standby mode signals on a first side to disable supply power from the primary side of the power converter to the first and second regulators, and responsive to the normal operating mode signals on the first side to enable supply power from the primary side of the power converter to the first and second regulators, the isolation device having a second side coupled between a second end of the first input resistor and a gate electrode of the switching element, wherein the low standby isolated power supply circuit is configured responsive to the normal operating mode signals to enable the first and second regulators, responsive to the standby mode signals to disable the first and second regulators, and in both modes to supply power to the controller and the one or more auxiliary sensors.

2. The LED driver of claim 1, wherein the isolation device comprises an opto-coupler having a phototransistor on the first side and a diode on the second side, wherein an anode of the diode is coupled to receive the standby mode signals and the normal operating mode signals.

3. The LED driver of claim 2, further comprising first and second resistors coupled in series on a first end to the output of the PFC stage, and on a second end to a ground on the primary side of the DC-DC converter, wherein a node between the first and second resistors is coupled to the first regulator as a voltage sensor; and wherein the low standby isolated power supply circuit further comprises a second opto-coupler having a phototransistor on a first side and a diode on a second side, an anode of the diode for the second opto-coupler is coupled to receive the standby mode signals and the normal operating mode signals, and the phototransistor for the second opto-coupler is configured responsive to said standby mode signals and said normal operating mode signals to respectively disconnect and connect the first and second resistors from the bus voltage.

4. The LED driver of claim 1, wherein one or more of the auxiliary sensors are configured to detect one or more environmental conditions representative of an occupancy state in a defined area associated with the LED load, and wherein the controller is configured to determine the occupancy state based on the detected one or more environmental conditions and generate the standby mode signals or normal operating mode signals based thereon.

5. The LED driver of claim 1, wherein one or more of the auxiliary sensors are configured to detect one or more environmental conditions representative of ambient light in a defined area associated with the LED load, and wherein the controller is configured to compare an ambient light level with a threshold light level based on the detected one or more environmental conditions and generate the standby mode signals or normal operating mode signals based thereon.

6. A low standby isolated power supply circuit for an LED driver including an input power stage, a power factor correction (PFC) stage driven by a first regulator to provide a DC bus voltage, an isolated DC-DC power converter stage driven by a second regulator to provide DC current to an LED lighting load, one or more auxiliary sensors configured to detect one or more environmental conditions, and a controller configured to provide first or second operating mode signals based on the detected one or more environmental condition from the one or more auxiliary sensors, the low standby isolated power supply circuit comprising:

a power converter having a primary side coupled to receive input power from the DC input power stage and a secondary side coupled to supply power to the LED driver controller and the one or more auxiliary sensors;

a switching element coupled to the primary side of the power converter;

an input resistor coupled on a first end between the switch and the primary side of the power converter; and an isolation device configured responsive to the first operating mode signals on a first side to disable supply power from the power converter to the first and second regulators, and responsive to the second operating mode signals to enable supply power from the power converter to the first and second regulators, the isolation device having a second side coupled between a second end of the first input resistor and a gate electrode of the switching element, wherein the LED driver controller and the one or more auxiliary sensors are enabled in both of the first and second operating modes, and wherein the PFC stage and the DC-DC converter of the LED driver are enabled only in the second operating mode.

7. The low standby isolated power supply circuit of claim 6, wherein the isolation device comprises an opto-coupler having a phototransistor on the first side and a diode on the second side, wherein an anode of the diode is coupled to receive the first and second operating mode signals.

* * * * *